United States Patent
Brochot

(10) Patent No.: US 9,216,761 B2
(45) Date of Patent: Dec. 22, 2015

(54) ECCENTRIC YOKE WITH BACKLASH COMPENSATION FOR THE STEERING SYSTEM OF A MOTOR VEHICLE

(71) Applicant: JTEKT EUROPE, Irigny (FR)

(72) Inventor: Patrice Brochot, Oullins (FR)

(73) Assignee: JTEKT EUROPE (FR)

( * ) Notice: Subject to any disclaimer, the term of this patent is extended or adjusted under 35 U.S.C. 154(b) by 0 days.

(21) Appl. No.: 14/410,577

(22) PCT Filed: Apr. 23, 2013

(86) PCT No.: PCT/FR2013/050898
§ 371 (c)(1),
(2) Date: Dec. 23, 2014

(87) PCT Pub. No.: WO2014/001663
PCT Pub. Date: Jan. 3, 2014

(65) Prior Publication Data
US 2015/0166096 A1    Jun. 18, 2015

(30) Foreign Application Priority Data

Jun. 25, 2012  (FR) ...................................... 12 55987

(51) Int. Cl.
*B62D 3/12*    (2006.01)
*F16H 55/28*    (2006.01)

(52) U.S. Cl.
CPC .............. *B62D 3/123* (2013.01); *F16H 55/286* (2013.01)

(58) Field of Classification Search
CPC ............................... B62D 3/123; B16H 55/283
See application file for complete search history.

(56) References Cited

U.S. PATENT DOCUMENTS

| | | | |
|---|---|---|---|
| 8,931,790 B2 * | 1/2015 | Brochot et al. | 280/93.514 |
| 2011/0265591 A1 * | 11/2011 | Plataret et al. | 74/409 |
| 2012/0266707 A1 * | 10/2012 | Brochot et al. | 74/409 |
| 2013/0091979 A1 * | 4/2013 | Bareis et al. | 74/568 R |
| 2015/0053030 A1 * | 2/2015 | Kim | 74/409 |

FOREIGN PATENT DOCUMENTS

| | | |
|---|---|---|
| DE | 19539864 C1 | 1/1997 |
| FR | 2951797 A1 | 4/2011 |
| WO | 2011048328 A1 | 4/2011 |

OTHER PUBLICATIONS

International Search Report issued Aug. 13, 2013 re: Application No. PCT/FR2013/050898; citing: WO 2011/048328 A1 and DE 195 39 864 C1.

* cited by examiner

*Primary Examiner* — Faye M Fleming
(74) *Attorney, Agent, or Firm* — Cantor Colburn LLP

(57) ABSTRACT

The yoke device comprises a rotary pad (10), the inner periphery (11) of which is eccentric with respect to the outer periphery (12) and is applied against the back of the rack, which is thus pushed towards the teeth of the steering pinion. The rotary pad (10) is rotationally biased and positioned by a backlash compensation mechanism (17) with spring means. This mechanism comprises a rotating movable stop (21), including gearings (24, 25) having staggered teeth that engage with the notches (26, 27) of a push member (19). The staggered gear teeth comprise, on one sector, a pilot gearing (24) having planar teeth (28) provided with a protrusion (29) and, in another sector, at least one gearing (25) having planar teeth (30) with no protrusion.

3 Claims, 4 Drawing Sheets

ECCENTRIC YOKE WITH BACKLASH COMPENSATION FOR THE STEERING SYSTEM OF A MOTOR VEHICLE

TECHNICAL FIELD

The present invention relates to, in general, the steering systems with racks of motor vehicles. More particularly, this invention is concerned with the "yoke" device of such a steering system, the function of which is to maintain the rack in mesh contact with a steering pinion, itself linked to a steering column, by compensating the defects of the gearings and wear thereof. Even more particularly, the invention relates to an "eccentric" type yoke device, which is a rotary pad device provided with an automatic compensation mechanism of the clearance between the steering pinion and the rack.

BACKGROUND

In a steering system with rack, the steering pinion is linked in rotation with the steering column, maneuverable using the driving wheel of the vehicle, and this pinion engages with the rack slidably mounted in a steering casing of elongated shape. The two ends of the rack, external to the casing, are coupled to steering rods respectively associated with the right and left steering wheels of the vehicle. Thus, the rotation of the wheel in one direction or the other is transmitted by the steering column to the steering pinion, and is converted into a corresponding translation of the rack which, by means of the steering rods, itself causes the coordinated orientation of the two steering wheels of the vehicle, for a "sharp turning" to the right or left.

In such a steering system, the yoke device elastically acts on the back of the rack, in the region of the steering pinion, to strongly press the gearing of this rack against said pinion, thus preventing any risk of loss of contact of the gearings. The yoke device is usually exhibited as a "yoke line", with a mobile part forming a friction pad, guided in translation and biased by elastic means towards the back of the rack.

It is also known the "eccentric" yoke devices, which replace the traditional concept of "linear" yoke by a rotating concept. In such a yoke device, it is provided a rotary pad of annular or arched shape which has an outer circular periphery and an inner periphery also circular but off centered with respect to the outer periphery thereof. The rotary pad is rotatably mounted in the steering casing, around a rotation axis parallel with the longitudinal axis of the rack. The inner off centered periphery of this pad presses against the back of the rack. The rotary pad is biased in rotation or positioned angularly in such a manner that its inner periphery, applied against the back of the rack, pushes back the latter towards the teeth of the pinion in such a manner as to keep the gearings engaged.

Particularly, French patent FR 2 951 797 or its international equivalent WO 2011/048328, on behalf of the applicant, describes a yoke device with eccentric, such as reminded above, in which a clearance compensation mechanism comprises a thrust member pressed on a radial arm of the rotary pad as a result of a compression spring inserted between the thrust member and a stationary support of the pad, or an integral element of said support. A mobile stop, rotatably mounted relatively to the support or to said element, comprises at least one gearing with stepped teeth which cooperates with at least one notch of the thrust member or vice versa. The mobile stop is linked by means of a torsion spring to the support or to the element integral with the support. Thus, the notch or notches successively cooperate with the stepped teeth of the or each gearing of the mobile stop, in such a manner as to "catch up" with the mechanical clearance in particular caused by wear.

Even more particularly, in the embodiment described by the aforementioned documents, the mobile stop is provided, at its end nearest the rotary pad, with at least two gearings with stepped teeth, disposed in as many toothed sectors, such as two diametrically opposed gearings each occupying a sector of 180°, these gearings cooperating with as many notches formed on the thrust member. The gearings of the mobile stop, by the number of two at minimum, are in theory identical, in particular to teeth all with globally triangular profile, and thus all simultaneously playing the same role.

However in practice, in the case where the mobile stop thus comprises several gearings, it may occur that due to the manufacturing defects certain toothed sectors block the rotation of the mobile stop when close to the maximum allowed clearance value, while another gearing already sees its following tooth engage on the corresponding notch of the thrust member. This may cause abnormal and premature wear of the parts of the clearance compensation mechanism and erratic operating of this mechanism, in which the contacts no longer take place on the required areas.

BRIEF SUMMARY

The purpose of the present invention is to prevent these drawbacks, and hence aims to provide a yoke device with eccentric of which the clearance compensation mechanism is perfected, at the gearings, in such a manner as to ensure the good operation and longevity of this mechanism and consequently of the yoke device assembly.

To this end, the invention provides a yoke device with eccentric for steering a motor vehicle, the yoke device comprising a rotary pad which has an outer periphery and an inner periphery off centered with respect to the outer periphery, the rotary pad being rotatably mounted in a steering casing around a rotation axis parallel with the longitudinal axis of the rack, the outer periphery of this pad bearing against a cradle of arched shape belonging to a support mounted in the steering casing, whereas its off centered inner periphery is applied against the back of the rack, in such a manner as to push back the latter towards the teeth of a steering pinion, said pad being biased and/or positioned in rotation by a clearance compensation mechanism with spring means, acting on a radial arm of the rotary pad, the clearance compensation mechanism comprising:

a thrust member mounted moveable in translation on the support but immobilized in rotation with respect to this support and pressed against the radial arm of the rotary pad as a result of a spring inserted between this thrust member and the support or an element integral with the support.

a mobile stop rotatably mounted relatively to said support or said element, at least two gearings with stepped teeth disposed on as many sectors at an end of the mobile stop and cooperating with notches formed on the thrust member, or vice versa, and a torsion spring linking the mobile stop to the support or to the element integral with the support, in such a manner that the notches may successively cooperate with the stepped teeth of the gearings, this yoke device being substantially characterized by the fact that the gearings with stepped teeth comprise on a sector a gearing called pilot gearing, with teeth of globally planar shape but each provided with a relief, and at least one gearing located on another sector, with teeth of globally planar shape, without relief.

Thus, the invention provides, on at least two sectors of the mobile stop, respective stepped gearings of different appearance, namely a pilot gearing with planar teeth, but also provided with reliefs and at least another gearing with simply planar teeth, without relief nor any other feature.

In an embodiment of the invention, the teeth of the pilot gearing exhibit, for example on their external edge, a relief of globally triangular profile.

The teeth of the pilot gearing, thus fashioned, ensure the minimum clearance value J1 and the maximum clearance value J2, such as defined in aforementioned French patent FR 2 951 797. On the sector or sectors, the teeth of planar configuration bear against the corresponding notches, at the same time as the teeth of the pilot gearing, to absorb the forces in an appropriately distributed manner around the central axis of the clearance compensation mechanism. Thus, only the teeth of the pilot sector, with their reliefs, block or allow the displacement of the mobile stop, caused by the torsion spring, the gearings of the other sector or other sectors having solely as role to absorb the forces, thus preventing any contradictory action of the gearings, with abnormal notch passages.

The notches, which cooperate with these gearings, remain identical for all sectors, and are each compatible with both the teeth of the pilot gearing and with the teeth of the other gearing or gearings. These notches may be simple notches, or double notches each cooperating with two successive teeth of a stepped gearing, thus increasing the mechanical resistance without decreasing the number of increments (?) for displacing the mobile stop.

It is worth noting that, while notably improving the operation of the clearance compensation mechanism, the solution provided by the present invention remains simple and cost effective. Particularly, the advantage of this solution is to require the devising of a single set of teeth, on a sector, whereas the geometry of the other gearings, on the other sectors, becomes simplified. As a result, the manufacture of the components of the clearance compensation mechanism and the operations of devising the equipment required for this production, become simplified.

BRIEF DESCRIPTION OF THE DRAWINGS

Anyway, the invention will be better understood using the following description, with reference to the accompanying schematic drawing representing, by way of example, an embodiment of this yoke with eccentric with clearance compensation for steering a motor vehicle.

DETAILED DESCRIPTION

Figure 1:
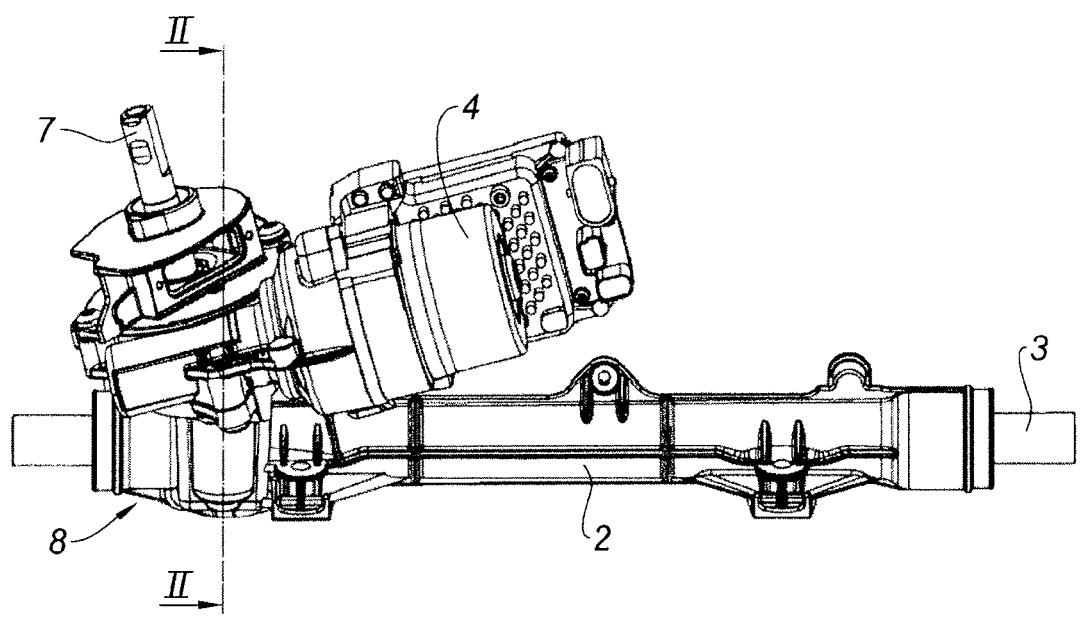
FIG. 1 is an external view of a power-assisted steering equipped with the yoke device with eccentric object of the present invention.

FIG. 1 shows a power assisted steering of motor vehicle, with (in the case of this example) an assistances acting at the steering pinion. This steering comprises a steering casing 2, which extends along a longitudinal axis. In the steering casing 2 is slidably mounted a rack 3, of which the ends external to the casing 2 are coupled to steering rods (here not represented). An assisted power motor 4 is coupled, by means of a gear reducer, to a steering pinion 5 which is engaged with the gearing 6 of the rack 3 (see also FIG. 2). The steering pinion 5 is linked to the inlet shaft 7, to which is coupled the steering column (not represented), maneuvered using the driving wheel of the vehicle.

Figure 2:
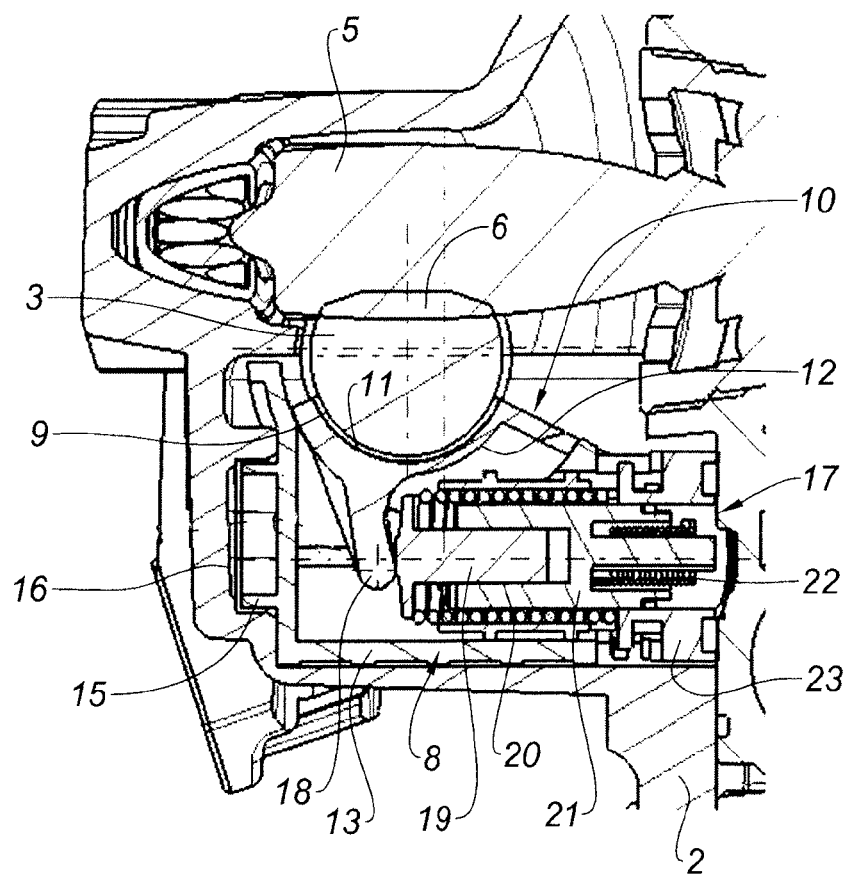
FIG. 2 is a sectional view according to line II-II of FIG. 1, ranging from the yoke device with eccentric.

A yoke device, designated in its assembly by the frame of reference 8, is provided in the vicinity of the steering pinion 5, to squeeze the gearing 6 of the rack 3 against the steering pinion 5, the yoke device 8 being represented in detail on FIG. 2 and after.

The yoke device 8 is placed on the side of the back 9 of the rack 3, in other words opposite the gearing 6 of this rack 3 and also opposite the steering pinion 5, this yoke device 8 being housed in a corresponding part of the steering casing 2.

The yoke device 8, of "eccentric" type, comprises a rotary pad 10, which is a rounded profile part and, more particularly, an arched part which has a "corner" shape. The rotary pad 10 exhibits an inner periphery 11 of profile in a circular arc which is off centered with respect to its outer periphery 12, also of profile in a circular arc. The off centered inner periphery 11 of the rotary pad 10 forms a bearing surface applied against the back 9 of the rack 3, in such a manner as to push back the gearing 6 of this rack 3 against the teeth of the steering pinion 5.

Figure 3:
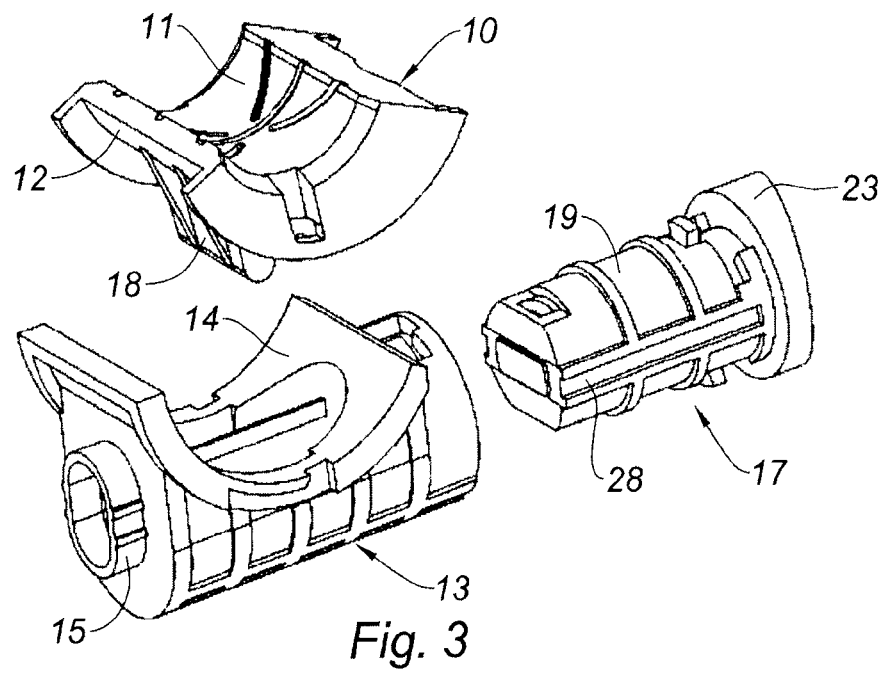
FIG. 3 is a perspective exploded view of this yoke device.

The rotary pad 10 is mounted and guided on a supporting part 13, itself mounted in the concerned region of the steering casing 2, the configuration of the supporting part 13 being visible on FIG. 3. This supporting part 13 comprises a cradle 14 of arched shape, on which slidably bears the outer periphery 12 of the rotary pad 10. At one end, the supporting part 13 exhibits a protrusion 15 of oblong shape meshed into a corresponding recess 16 of the steering casing 2 (see also FIG. 2).

Figure 4:
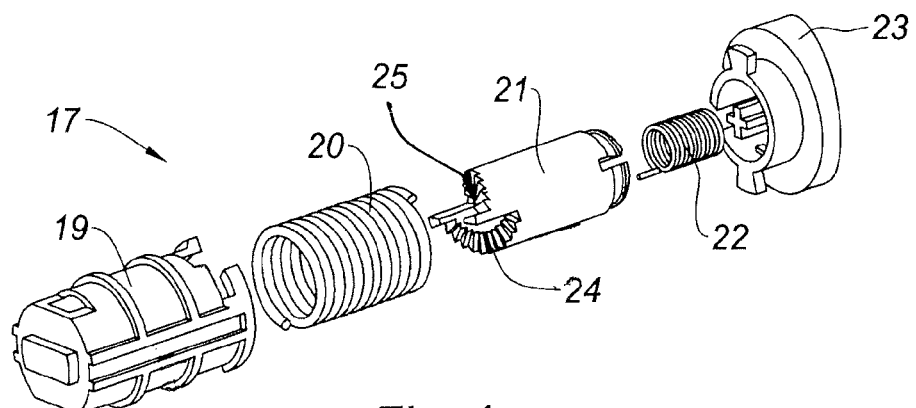
FIG. 4 represents, in exploded perspective, the clearance compensation mechanism of the yoke device, with its diverse components.

The rotary pad 10 is put in rotation with respect to the supporting part 13 by applying a thrust, exerted by a clearance compensation mechanism 17 on a radial arm 18 comprised by the rotary pad 10. The clearance compensation mechanism 17, visible on FIG. 4 and after, mainly comprises a thrust member 19, a compression spring 20, a mobile stop 21, a torsion spring 22 and a bearing element 23.

The thrust member 19, of general cylindrical shape, is guided in translation and immobilized in rotation on the supporting part 13. This thrust member 19 is applied against the radial arm 18 of the rotary pad 10 under the force of the compression spring 20, which is inserted between the thrust member 19 and the bearing element 23, itself integral with the supporting part 13.

The mobile stop 21 is a general cylindrical shaped part, cored-out in its center, which is rotatably mounted relatively to the bearing element 23. The torsion spring 22, housed in the central recess of the mobile stop 21, connects this mobile stop 21 to the bearing element 23, by biasing said mobile stop 21 in rotation in a predefined direction.

The mobile stop 21 is provided, at its end farthest from the bearing element 23 hence the nearest to the rotary pad 10, with two gearings 24 and 25 with stepped teeth, distributed on its circumference along two opposite sectors 180° each. The two gearings 24 and 25 of the mobile stop 21 respectively cooperate with two diametrically opposite notches 26 and 27, formed at one end of the thrust member 19. As a result of the torsion spring 22, the two notches 26 and 27 successively cooperate with the stepped teeth of the two gearings 24 and 25, as the wear increases.

Figure 5:
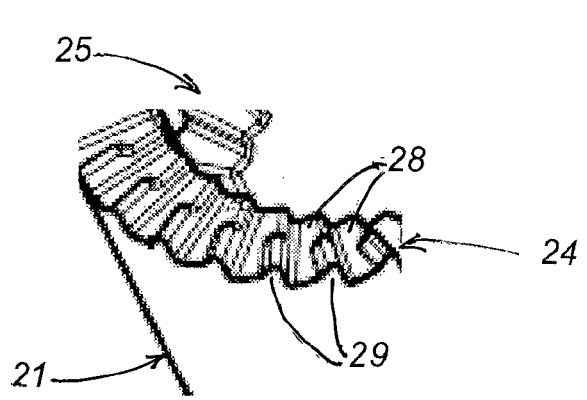
FIG. 5 is a perspective view of the pilot gearing formed on the mobile stop.
Figures 6, 7:
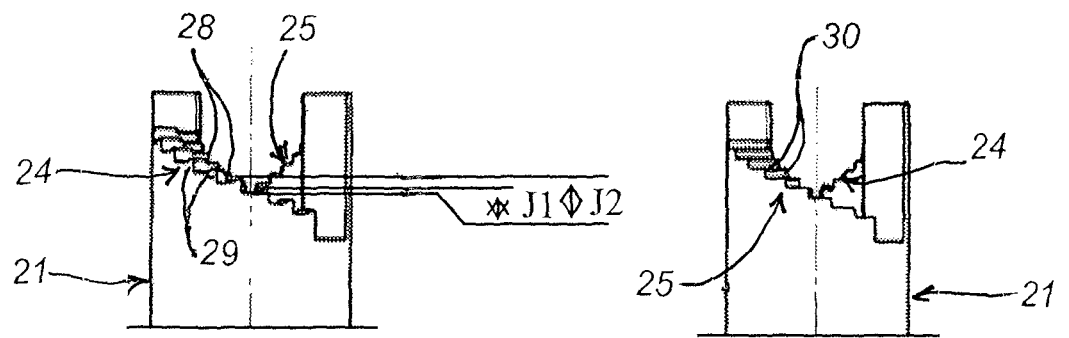
FIG. 6 is a side view of this pilot gearing.
FIG. 7 is a side view of the other gearing formed on the mobile stop.

According to the invention, the two gearings 24 and 25 with stepped teeth of the mobile stop 21 have different configurations, as illustrated by FIGS. 5 to 7.

The gearing 24, called pilot gearing, has stepped teeth 28 of globally planar shape, completed for each tooth 28 by a relief 29 of globally triangular profile, formed on the external edge of this gearing 24—see FIGS. 5 and 6.

The other gearing 25 has stepped teeth 30 of globally planar shape, similar to the teeth 28 of the pilot gearing 24 but without any relief—see FIG. 7.

Figures 8, 9:
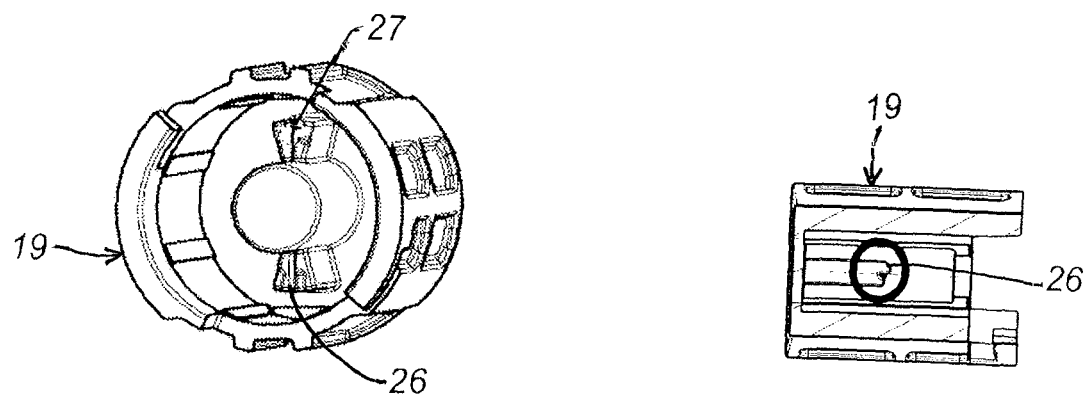
FIG. 8 is a perspective view of the thrust member with its notches.
FIG. 9 is a sectional view of the thrust member, showing a double notch of this member.

As FIG. 8 and especially 9 show, the two notches 26 and 27 of the thrust member 19 are advantageously double notches, that is to say, notches which each exhibits two axially offset areas in such a manner as to be able to cooperate with two successive teeth 28 or 30 of the pilot gearing 24 or of the other gearing 25. The two notches 26 and 27 are here identical, contrarily to the two gearings 24 and 25.

Figure 10:
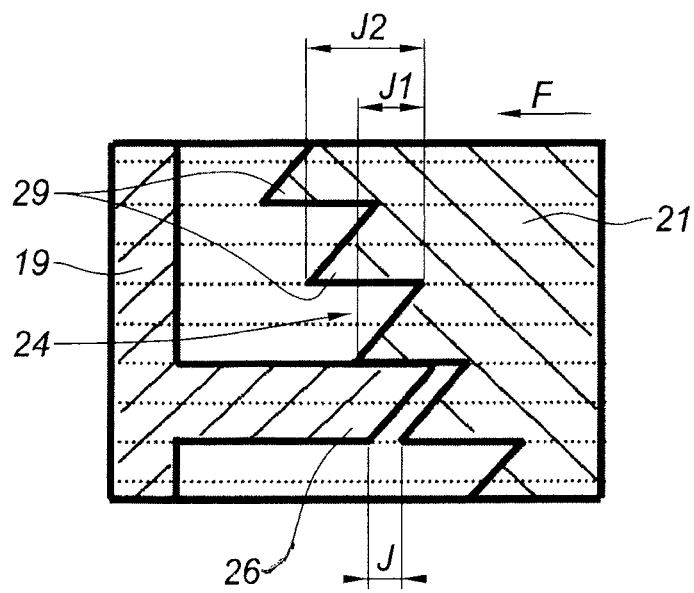
FIG. 10 is a block diagram of the clearance compensation mechanism.

In standard operation, as is schematically illustrated on FIG. 10, the clearance compensation mechanism 17 is in a configuration such that each notch 26 or 27 of the thrust member 19 is in contact against a wall of a tooth 28 or 30 of the gearing 24 or 25 of the mobile stop 21. The thrust F of the compression spring 20 is exerted on the thrust member 19, which transmits it itself to the radial arm 18 of the rotary pad 10, in such a manner that the rack 3 be maintained in contact with the steering pinion 5. This state of operation is maintained for any clearance value J ranging between a minimum clearance value J1 and a maximum clearance value J2.

The stepped teeth 28 of the pilot gearing 24, and particularly the reliefs 29 of these teeth 28, have a shape and dimensions which ensure the minimum clearance value J1 and the maximum clearance value J2. Thus, the distance (measured axially) between the summit of a relief 29 and the planar surface of the corresponding tooth 28 corresponds to the minimum clearance value J1. The distance (measured axially) between the planar surface of a tooth 28 and the summit of the relief 29 of the following tooth 28 corresponds to the maximum clearance value J2.

In operation, only the pilot gearing 24 controls, by the reliefs 29 of the teeth 28 thereof, the passage of the notches 26 and 27 on the following teeth, hence the displacement of the mobile stop 21, when the clearance J exceeds the maximum clearance value J2. The teeth 30 of planar shape of the other gearing 25 press at the same time as the teeth 28 of the pilot gearing 24, in order to distribute and absorb the load, without intervening in the control of the displacement of the mobile stop 21.

As it is known per se, the invention is not limited to the sole embodiment of this yoke with eccentric with clearance compensation which has been described above, by way of example; it encompasses, on the other hand, all the alternative embodiments and application alternatives pertaining to the same principle. Thus, one would not depart in particular, from the scope of the invention:

by modifying the shapes of detail, particularly those of the reliefs of the teeth of the pilot gearing;

by multiplying the number of stepped gearings other than the pilot gearing, all the gearings being distributed on the circumference of the mobile stop according to corresponding sectors;

by inverting the roles of the thrust member and of the mobile stop, that is to say by forming the stepped gearings on the thrust member and the notches on the mobile stop;

by intending the same yoke with eccentric for all types of steering systems: manual steering, power assisted steering, hydraulic assisted steering, with assistance able to act on diverse points of the steering system.

The invention claimed is:

1. A yoke device with eccentric for steering a motor vehicle, the yoke device comprising:
   a rotary pad which has an outer periphery and an inner periphery off centered with respect to the outer periphery, the rotary pad being rotatably mounted in a steering casing around a rotation axis parallel with the longitudinal axis of the rack, the outer periphery of this pad bearing against a cradle of arched shape belonging to a support mounted in the steering casing, whereas its off centered inner periphery is applied against the back of the rack, in such a manner as to push back the latter towards the teeth of a steering pinion, said pad being biased and/or positioned in rotation by a clearance compensation mechanism with spring means, acting on a radial arm of the rotary pad,
   the clearance compensation mechanism comprising:
   a thrust member mounted moveable in translation on the support but immobilized in rotation with respect to this support and pressed against the radial arm of the rotary pad as a result of a spring inserted between this thrust member and the support or an element integral with the support,
   a mobile stop rotatably mounted relatively to said support or said element,
   at least two gearings with stepped teeth disposed on as many sectors at an end of the mobile stop and cooperating with notches formed on the thrust member, or vice versa,
   and a torsion spring linking the mobile stop to the support or to the element integral with the support,
   in such a manner that the notches may successively cooperate with the stepped teeth of the gearings,
   wherein the gearings with stepped teeth comprise on a sector a gearing called pilot gearing, with teeth of globally planar shape but each provided with a relief, and at least one gearing located on another sector, with teeth of globally planar shape, without relief.

2. The yoke device with eccentric according to claim 1, wherein the teeth of the pilot gearing exhibit a relief of globally triangular profile.

3. The yoke device with eccentric according to claim 1, wherein the notches, which cooperate with the stepped gearings, are double notches each cooperating with two successive teeth of a stepped gearing.

* * * * *